United States Patent
Tomita et al.

(10) Patent No.: US 7,561,958 B2
(45) Date of Patent: Jul. 14, 2009

(54) INFORMATION PROVIDING SYSTEM AND NAVIGATION APPARATUS

(75) Inventors: Hiroshi Tomita, Okazaki (JP); Kenji Nagase, Aichi (JP)

(73) Assignee: Aisin AW Co., Ltd. (JP)

( * ) Notice: Subject to any disclaimer, the term of this patent is extended or adjusted under 35 U.S.C. 154(b) by 513 days.

(21) Appl. No.: 11/406,433

(22) Filed: Apr. 19, 2006

(65) Prior Publication Data
US 2006/0267801 A1    Nov. 30, 2006

(30) Foreign Application Priority Data
Apr. 28, 2005    (JP)    ............................. 2005-132500

(51) Int. Cl.
    *G01C 21/00*    (2006.01)
(52) U.S. Cl. ..................................... 701/200
(58) Field of Classification Search ........................ None
    See application file for complete search history.

(56) References Cited

U.S. PATENT DOCUMENTS

| | | | |
|---|---|---|---|
| 5,774,828 A | 6/1998 | Brunts et al. | 701/210 |
| 6,185,501 B1 * | 2/2001 | Smith et al. | 701/200 |
| 6,349,257 B1 * | 2/2002 | Liu et al. | 701/200 |
| 6,405,126 B1 | 6/2002 | Palomo et al. | 701/207 |
| 6,721,654 B2 * | 4/2004 | Akiyama | 701/209 |
| 7,251,559 B2 | 7/2007 | Maekawa et al. | 701/200 |
| 2001/0042125 A1 | 11/2001 | Watanabe et al. | 709/227 |
| 2004/0068362 A1 * | 4/2004 | Maekawa et al. | 701/200 |

FOREIGN PATENT DOCUMENTS

| | | |
|---|---|---|
| JP | 2002-350168 | 12/2002 |
| JP | 2003-302224 | 10/2003 |
| JP | 2004-085496 | 3/2004 |
| JP | 2004-163206 | 6/2004 |
| JP | 2005-338006 | 12/2005 |
| WO | WO 01/60131 | 8/2001 |

* cited by examiner

*Primary Examiner*—Michael J. Zanelli
(74) *Attorney, Agent, or Firm*—Bacon & Thomas, PLLC

(57) ABSTRACT

In an information providing system insertion of a card into a navigation apparatus is detected, and information about a facility specifically related to the card is provided. If one of a wireless communication card, a memory card, an ETC card, an HDD card, and a credit card is inserted into a card slot or an ETC card slot, traffic information or facility information related to the inserted card is transmitted from an information center to the navigation apparatus, and the traffic information or the facility information specifically related to the inserted card is provided to a user, in addition to normal route guidance information.

9 Claims, 8 Drawing Sheets

| CARD NAME | PROVIDED INFORMATION |
|---|---|
| ETC CARD | TRAFFIC INFORMATION IN TERMS OF TRAFFIC CONGESTION OR TRAFFIC RESTRICTION ASSOCIATED WITH EXPRESSWAYS LOCATIONS AND FEES OF PARKING LOTS THAT ARE ALLOWED TO BE USED BY ETC CARDS |
| WIRELESS COMMUNICATION CARD | LOCATIONS OF FACILITIES WHERE HOT SPOTS ARE AVAILABLE |
| MEMORY CARD | GUIDANCE INFORMATION ABOUT FACILITIES STORED IN MEMORY CARD |
| HDD CARD | GUIDANCE INFORMATION ABOUT FACILITIES STORED IN HDD CARD |
| CREDIT CARD | GUIDANCE INFORMATION ABOUT FACILITIES THAT ARE ALLOWED TO BE USED UNDER CONTRACT |

FIG. 3

INFORMATION PROVIDING SYSTEM AND NAVIGATION APPARATUS

INCORPORATION BY REFERENCE

The disclosure of Japanese Patent Application No. 2005-132500 filed on Apr. 28, 2005, including the specification, drawings and abstract thereof, is incorporated herein by reference in its entirety.

BACKGROUND OF THE INVENTION

1. Field of the Invention

The present invention relates to an information providing system adapted to provide information stored in an information providing apparatus to a user in a vehicle via a navigation apparatus and also to the navigation apparatus. More particularly, the present invention relates to an information providing system and a navigation apparatus, which provide information about a facility associated with a card when it is detected that the card is ready to be read by card reading means, thereby providing improved convenience to the user.

2. Description of the Related Art

In recent years, it has become popular to install a navigation apparatus in a vehicle to receive route guidance for assisting a driver to easily reach a destination. The navigation apparatus is an apparatus capable of detecting the current position of a vehicle by using a GPS receiver or the like, acquiring map data corresponding to the detected current position from a storage medium such as a DVD-ROM or via a network, displaying a map according to the acquired map data on a liquid crystal display or the like, searching for a route to a destination specified by a user, and displaying the retrieved route on the map in a superimposed manner. In such a navigation apparatus, if a destination is input, a search is initiated to determine an optimum route from the current position of the vehicle to the specified destination, and the determined navigation route is displayed on the display screen in accordance with the retrieved optimum route. When the vehicle is approaching a crossing, voice guidance is provided so that a driver can correctly reach the destination. The navigation apparatus also has the capability of acquiring information on traffic congestion or the like from an information center and outputting the acquired information in the form of voice or video data.

However, although the information center that provides information to the navigation apparatus is capable of determining an area (such as an area in the vicinity of the current position of the vehicle or an area close to a destination) for which traffic information should be provided, based on the current position and the direction of travel of the vehicle or destination information, the information center does not have the capability of selecting information in accordance with the desire or intention of the user and providing the selected information to the user. To solve such a problem, Japanese Unexamined Patent Application Publication No. 2003-302224 discloses a navigation apparatus capable of receiving information about a traffic condition, in an area on a route described in a user information database, from an information providing center, thereby allowing a user to easily acquire detailed information about traffic information in terms of, for example, congestion on the route along which the vehicle is traveling.

However, in the navigation apparatus disclosed in Japanese Unexamined Patent Application Publication No. 2003-302224, although it is possible to easily acquire information about traffic conditions along a route, the acquirable information is limited to that associated with the route to the destination that is set in advance by the driver, before the driver starts driving the vehicle. That is, the driver cannot obtain various information for conditions that may change from time to time. Recently, in-vehicle navigation apparatus have been provided with a wide variety of functions and are capable of providing an even wider variety of functions by communication with external apparatus. However, there remains a need for an information providing system capable of selecting information that is really necessary (most important) for the user who uses such a navigation apparatus, in accordance with current conditions, and providing the selected information to the user.

SUMMARY OF THE INVENTION

In view of the above problems, it is an object of the present invention to provide an information providing system and a navigation apparatus having the capability of providing information about a facility associated with a card to a user when card reading means is ready to read the card, thereby making it possible to select information that is really necessary for the user and to provide the selected information to the user, thus providing a great convenience to the user.

According to one embodiment, the present invention is an information providing system including an information providing apparatus and a navigation apparatus. The information providing apparatus includes information storage means for storing information and information transmission means for transmitting the information stored in the information storage means to the navigation apparatus.

The navigation apparatus includes current position detection means for detecting a current position of a vehicle, information reception means for receiving information transmitted from the information providing apparatus, and information providing means for providing the information received by the information reception means to a user, the information providing system further including card reading means for reading information stored in a card or information transmitted to the card. The navigation apparatus further includes card detection means for detecting readiness to read the information by the card reading means, information acquisition means for, when the card detection means detects readiness to read the information on the inserted card, acquiring information about a facility associated with the card, from the information providing apparatus, and associated facility information providing means for providing, via the information providing means, information associated with the facility acquired by the information acquisition means, based on the current position of the vehicle detected by the current position detection means.

The "card reading means" may be integrated into the navigation apparatus or may be disposed separately from the navigation apparatus.

In another embodiment, the information providing apparatus includes, as in the previously described embodiments, information storage means for storing information and information transmission means for transmitting the information stored in the information storage means to the navigation apparatus, but further includes ETC card reading means for reading information stored in an ETC card. The navigation apparatus includes, as in the previously described embodiment current position detection means for detecting a current position of a vehicle, information reception means for receiving information transmitted from the information providing apparatus, and information providing means for providing the received information to the user. However, in this embodiment the navigation apparatus further includes ETC card detection means for detecting whether the navigation apparatus is ready to read the information by the ETC card reading means, information acquisition means for, when the ETC card detection means detects readiness to read the information stored in the ETC card, acquiring traffic information associated with a expressway from the information providing apparatus, and associated traffic information providing means for providing, via the information providing means, traffic information associated with the expressway, based on the current position of the vehicle detected by the current position detection means.

Alternatively, the information acquisition means may, when the ETC card detection means detects readiness to read the information stored on the ETC card, acquire information associated with a parking area, where use of the ETC card is allowed, from the information providing apparatus, in which case the associated traffic information providing means for provides, via the information providing means, the information associated with the parking area acquired by the information acquisition means, based on the current position of the vehicle detected by the current position detection means.

According to another embodiment of the present invention, the navigation apparatus includes current position detection means for detecting a current position of a vehicle, card detection means for detecting readiness to read, by card reading means, information stored in a card or information transmitted to the card, information acquisition means for, when the card detection means detects readiness to read the information on or transmitted to the inserted card, acquiring information about a facility associated with the card which has become ready to be read, and associated facility information providing means for providing information associated with the facility, based on the current position of the vehicle detected by the current position detection means.

The "information acquisition means" may acquire information from storage means disposed inside the navigation apparatus or may acquire information from storage means external to the navigation apparatus via communication means or the like.

According to another embodiment of the present invention, the navigation apparatus includes current position detection means for detecting a current position of a vehicle, ETC card detection means for detecting readiness to read information stored in an ETC card by ETC card reading means, information acquisition means for, when the ETC card detection means detects readiness to read the information stored in the ETC card, acquiring traffic information associated with a expressway, and associated traffic information providing means for providing the traffic information associated with the expressway, based on the current position of the vehicle detected by the current position detection means.

In yet another embodiment of the present invention, the navigation apparatus includes current position detection means for detecting current position of a vehicle, ETC card detection means for detecting readiness to read information stored in an ETC card by ETC card reading means, information acquisition means for, when the ETC card detection means detects readiness to read the information from inserted ETC card, acquiring information associated with a parking area where use of the ETC card is allowed, and associated parking lot information providing means for providing information associated with the parking area, based on the current position of the vehicle detected by the current position detection means.

In the present invention, when the navigation apparatus is ready to read information stored in or transmitted to the card, information about a facility associated with the card is acquired from the information providing apparatus based on the current position of the vehicle and the acquired information is supplied to the user. Thus, it is possible to select information related to the inserted card from among information provided by the information providing apparatus and to provide the thus selected information to the user via the navigation apparatus. Thus, the user can obtain necessary information correctly representing the current conditions.

In embodiments wherein traffic information associated with a expressway is acquired from the information providing apparatus based on the current position of the vehicle and the acquired information is supplied to the user, it is possible to limit the acquired information to that associated with the expressway to be traveled by the user, and to provide that acquired information to the user via the navigation apparatus. Thus, the user can obtain information correct for the current conditions, thereby improving convenience to the user.

Where information for a parking area allowing use the ETC card, based on the current position, is acquired from the information providing apparatus, it is possible to acquire information specific to a parking area predicted to be used by the user. Likewise, in other embodiments, information about a facility associated with the inserted card, based on the current position of the vehicle, is selected and supplied to the user.

Where traffic information associated with a expressway is acquired, based on the current position of the vehicle, by reading from an ETC card, it is possible to acquire information specific to an expressway to be run by the user, and to provide that specific information to the user. Where information for a parking area allowing use of the ETC card, based on the current position of the vehicle, is selected and supplied to the user, it is possible to acquire information specific to a parking area predicted to be used.

Where information about a facility associated with an ETC card, or traffic information is acquired from the information providing apparatus, it is possible to select information specifically related to the inserted card from among information provided by the information providing apparatus and to provide that selected information, correctly reflecting current conditions, to the user.

BRIEF DESCRIPTION OF THE DRAWINGS

FIG. 3 shows an example of information provided by a navigation apparatus, based on an inserted card.

DESCRIPTION OF THE PREFERRED EMBODIMENTS

An information system according to an embodiment of the present invention is described below with reference to the accompanying drawings. First, the overall structure of the information system 1 according to the present embodiment of the invention will be described with reference to FIG. 1.

Figure 1:
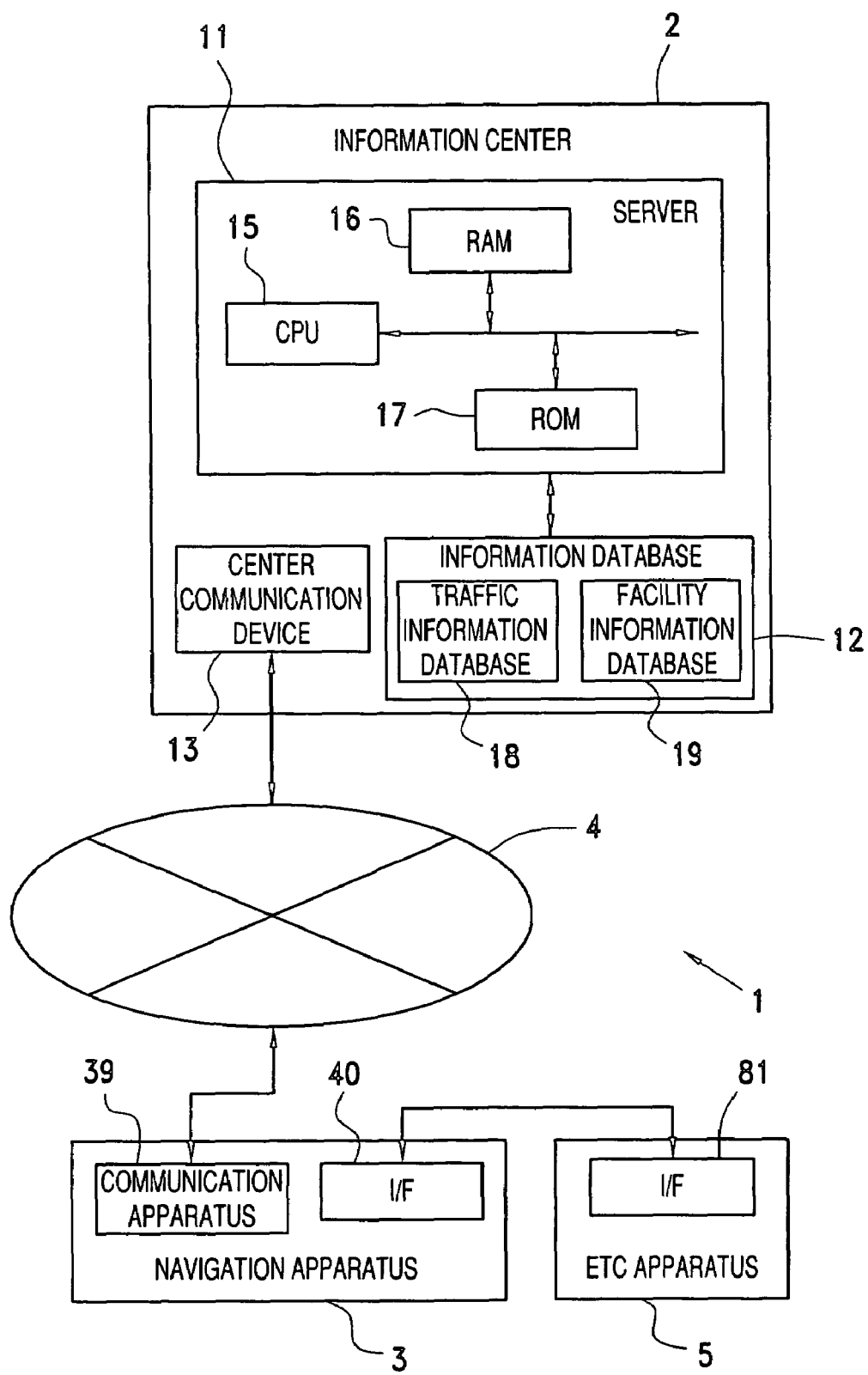
FIG. 1 is a block diagram of an information system according to an embodiment of the present invention.

As shown in FIG. 1, the information system 1 includes an information center (information providing apparatus) 2, a navigation apparatus 3, and a network 4. The information center 2 and the navigation apparatus 3 are connected with each other via the network 4 so that various information can be transmitted between them.

The network 4 may be a LAN (Local Area Network), a WAN (Wide Area Network), a portable telephone network, a telephone network, a public communication network, a private communication network, or a communication network such as the internet. A communication system using CS broadcasting, BS broadcasting, terrestrial digital television broadcasting, or FM multiplex broadcasting may also be used as the network 4. A communication system using a non-stop automatic toll payment system (Electronic Toll Collection or "ETC"), a system used in ITS (Intelligent Transportation System) or a DSRC (Dedicated Short Range Communications) system may also be used as the network 4.

The navigation apparatus 3 is connected to an ETC (Electronic Toll Collection System) apparatus 5 via interfaces 40 and 81 so that they can communicate with each other. The ETC apparatus 5 is an apparatus installed in a vehicle for automatic toll payment without stopping at tollgates. More specifically, at a tollgate of an IC (interchange) on an expressway, the ETC apparatus 5 wirelessly communicates with an on-road toll collection apparatus (not shown) to make a toll-road payment using an IC card, referred to as an ETC card, inserted in an ETC card slot 84 (see FIG. 2) of the ETC apparatus 5.

Now, referring to FIG. 1, the structure of the information center 2 of the information system 1 is described below.

As shown in FIG. 1, the information center 2 includes a server 11, an information storage unit serving as an information database (Information storage means) 12 connected to the server 11, and a center communication device (information transmission means) 13. The server 11 includes a CPU 15 and internal storage devices including a RAM 16 and a ROM 17. The CPU 15 serves as a calculation/control device responsible for control over the whole server 11. The RAM 16 is used by the CPU 15 as a working memory in various calculations and/or control operations. The ROM 17 is used to store various control programs that control an information extraction/transmission process for extraction of information from an information database 12, in accordance with communication with the navigation apparatus 3, and for transmission of the extracted information to the navigation apparatus 3. An MPU or the like may be used instead of the CPU 15.

The information database 12 includes a traffic information database 18 in which traffic information for roads throughout the whole nation is stored, and a facility information database 19 including facility information for facilities at various locations throughout the whole nation. If the server 11 receives a request for information from the navigation apparatus 3, the server 11 generates the requested information from information stored in the database 18 or 19, and provides the generated information to the navigation apparatus 3 via the center communication device 13.

The traffic information data stored in the traffic information database 18 includes data indicating congestion, accidents, traffic, and/or average vehicle speed on various roads such as interstate highways, state roads, city roads, expressways, urban expressways, and toll roads.

Facility information data stored in the facility information database 19 includes data indicating names, addresses, and telephone numbers of facilities such as hotels, gas stations, parking lots, interchanges of expressways, tourist attractions, and department stores, and also includes facility guidance information and data indicating acceptance of ETC cards at such facilities.

The server 11 downloads the latest traffic information from a traffic information center or the like via a private communication line at scheduled time intervals and updates traffic information stored in the traffic information database 18 in accordance with the downloaded latest traffic information. Similarly, the latest facility information associated with facilities is downloaded from a particular information center or the like and stored in the facility information database 19.

The information center 2 may be operated by any individual or organization such as a company, a corporation, a local government, or a government agency. For example, the information center 2 may be operated by a VICS (Vehicle Information and Communication System (registered trademark)) center.

Figure 2:
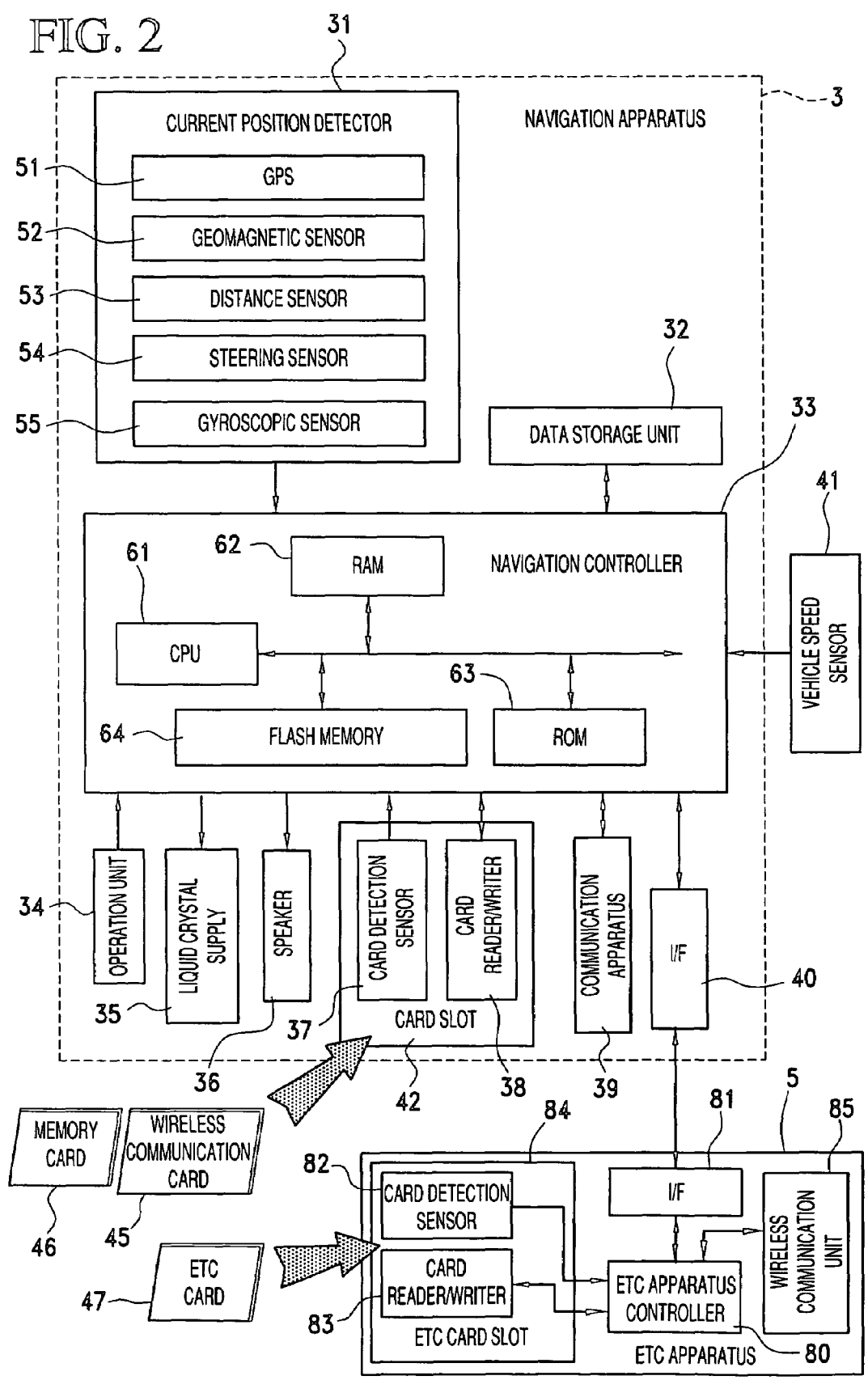
FIG. 2 is a block diagram of navigation apparatus of the information system according to an embodiment of the present invention.

Now referring to FIG. 2, the navigation apparatus 3 of the information system 1 includes a current position detector (current position detection means) 31 for detecting the current position of the vehicle, a data storage unit 32 in which various kinds of area data are stored, a navigation controller 33 for performing various kinds of calculations or control operations in accordance with input information, an operation unit 34 used by a user to input a command or data, a liquid crystal display (information providing means) 35 for displaying information such as a map, and a speaker (information providing means) 36 for outputting voice guidance associated with a route. Further, a card detection sensor 37 is disposed in a card insertion slot 42 formed in the front panel of the navigation apparatus 3 and serves to detect whether a particular card has been inserted in the card slot 42 (that is, whether the system is ready to read information stored in the inserted card or information transmitted to the inserted card). The navigation apparatus further includes a card reader/writer (card reading means) 38 for reading/writing information from/into a card inserted in a card slot 42, a communication apparatus (information reception means) 39 for communicating with the information center 2, and an interface 40 for connecting with the information center 2. The navigation controller 33 is connected to a vehicle speed sensor 41 for detecting the running speed of the vehicle.

The navigation apparatus 3 further includes a current position detector 31 including a GPS 51, a geomagnetic sensor 52, a distance sensor 53, a steering sensor 54, a gyroscopic sensor 55 serving as a direction detector, and an altimeter (not shown), whereby the current position and direction of the vehicle and the distance to a target (such as a crossing) are detected.

More specifically, the GPS 51 receives radio signals transmitted from artificial satellites and detects the current global position of the vehicle from the received radio signals. The geomagnetic sensor 52 measures geomagnetism to detect the direction of the vehicle. The distance sensor 53 detects the distance between particular points on a road, for example, by measuring the rotational speed of the wheels of the vehicle and detecting the distance based on the measured rotational speed, or by measuring the acceleration and integrating the measured acceleration twice.

The steering sensor 54 detects the rudder angle of the vehicle and may be an optical rotation sensor or a resistive rotation sensor attached to a component rotatable with the steering wheel (not shown) or an angle sensor attached to a wheel.

The gyroscopic sensor 55 detects the angle of traverse of the vehicle. As for the gyroscopic sensor 55, for example, a gas-rate gyroscope or a vibrating gyroscope may be used. By integrating the angle of traverse detected by the gyroscopic sensor 55, it is possible to determine the direction of the vehicle.

The data storage unit 32 includes a hard disk (not shown) serving as an external storage device and a storage medium, a program stored on the hard disk, and a recording head (not shown) for reading map data or the like from the hard disk and for writing data on the hard disk. Although in the present embodiment, the hard disk is used as the external storage device and the storage medium of the data storage unit 32, another type of magnetic disk such as a floppy disk may be used as the external storage device. Alternatively, a memory card, a magnetic tape, a magnetic drum, a CD, a MD, a DVD, an optical disk, a MO, an IC card, or optical card may be used as the external storage device.

The navigation controller 33 includes a CPU 61 and internal memories including a RAM 62, a ROM 63, and flash memory 64. The CPU 61 serves as a calculation/control unit responsible for overall control of the whole navigation apparatus 3. The RAM 62 is used as a working memory in calculations performed by the CPU 61 and is also used to store route data obtained by searching. In the ROM 63 are stored programs including a control program, a route guidance program for searching for a route to the destination and providing navigation guidance along the route determined by the searching, and an information providing program (see FIGS. 4 and 5) for controlling output of information associated with a particular card or an ETC card 47 when the card is inserted into the card slot 42 or the ETC card 47 is inserted into the ETC apparatus 5. The flash memory 64 is used to store a program read from the ROM 63. A semiconductor memory or a magnetic core may be used for the RAM 62, the ROM 63, and the flash memory 64. A MPU may be used for the calculation/control unit instead of the CPU 61.

Although in the present embodiment, various programs are stored in the ROM 63 and various data are stored in the data storage unit 32, programs and data may be stored in a single external device or the memory card 46 or a HDD card inserted in the card slot 42, or programs and data may be read from a memory card or the like and stored in the flash memory 64. When the memory card 46 or a HDD card is used, it is possible to update the programs or data by exchanging the memory card 46 or the HDD card for a more current card. When an automatic transmission controller is installed in the vehicle to control an automatic transmission (not shown), a program and data used to control the automatic transmission controller may also be stored on the hard disk.

The navigation controller 33 is electrically connected to various peripheral units including the operation unit 34, a liquid crystal display 35, a speaker 36, the card detection sensor 37, the card reader/writer 38, the communication apparatus 39, and the interface 40.

The operation unit 34 includes various keys and buttons serving as operation switches (not shown) used to correct the current position when travel is started and also used to input a start point from which route guidance is started and a destination at which the route guidance is ended. In particular, in the navigation apparatus 3, the operation unit 34 is also used to select information from a list of facilities (see FIG. 8) stored in the memory card 46 and displayed on the liquid crystal display 35. In accordance with switch signals generated when the above-mentioned switches are pressed, the navigation controller 33 controls various operations. The operation unit 34 may be, for example, a keyboard, a mouse, a barcode reader, a remote controller, a joystick, a light pen, or a stylus pen, etc. A touch panel disposed on the front surface of the liquid crystal display 35 may also be used as the operation unit 34.

The liquid crystal display 35 is used to display a wide variety of information such as operation guidance information, operation menus, key guidance information, a navigation route from the current position to the destination, guidance information for guidance along the navigation route, traffic information, news, weather forecast information, time information, mail, television programming, traffic information and facility information, based on the card inserted in the card slot 42. Instead of the liquid crystal display 35, a CRT display, a plasma display, or a hologram display adapted to project a hologram image on a windshield of the vehicle may be used.

The speaker 36 is used to output voice guidance for the navigation route and/or traffic information and/or facility information based on the card inserted in the card slot 42, under the control of the navigation controller 33. Specific examples of voice guidance are "Turn to the right at a crossing 200 m ahead" and "There is traffic congestion on National Road oo the vehicle is approaching". The voice guidance information may be output using voice synthesis or by reading voice data recorded in advance on a tape, in a memory, or the like. Various kinds of sound may also be output by means of synthesis or recording.

The card detection sensor 37 is disposed in the card slot 42 of the navigation apparatus 3 to detect whether a card such as a wireless communication card 45, the memory card 46, the HDD card, or a credit card is inserted in the card slot 42. That is, the card detection sensor 37 detects whether information may be read on a storage medium such as an IC chip, a magnetic disk, or a magnetic tape of the memory card 46, the HDD card, or the credit card, i.e. whether the navigation apparatus 3 is ready to read information from such a card. Alternatively, the sensor 37 determines whether the navigation apparatus 3 is ready to read information received by the wireless communication card 45.

The card reader/writer 38 is used to read information stored on the storage medium such as the IC chip, the magnetic disk, or the magnetic tape of the memory card 46, the HDD card, or the credit card inserted in the card slot 42, and is also used to write information on the storage medium. The card reader/writer 38 is also used to read information received by the wireless communication card 45.

The communication apparatus 39 includes a beacon receiver for receiving a radio beacon signal or an optical beacon transmitted, respectively, from a radio beacon transmitter or an optical beacon transmitter disposed along the road to receive information on traffic congestion and, traffic accidents, parking lot information, and facility information indicating, for example, congestion in a service area, originally transmitted from the information center 2. The communication apparatus 39 (network device) may be a LAN, a WAN, an intranet, a portable telephone network, a telephone network, a public communication network, a private communication network, or a communication network, such as the Internet, which allows reception of information. The communication apparatus 39 may also suitably be a FM receiver for receiving FM multiplex information such as news or weather forecast information. The beacon receiver and the FM receiver may be integrated into a single unit or may be disposed separately.

The interface 40 is a communication interface for connecting the navigation controller 33 and the ETC apparatus 5. If the ETC card 47 is inserted into the ETC card slot 84 of the ETC apparatus 5 serving as an insertion slot for inserting the ETC card 47, the navigation controller 33 receives via the interface 81 of the ETC apparatus 5 a detection signal indicating the detection of insertion of the ETC card 47.

Now, referring to FIG. 2, the ETC apparatus 5 connected to the navigation apparatus 3 is described below.

As shown in FIG. 2, the ETC apparatus 5 includes a wireless communication unit 85, an ETC apparatus controller 80, an interface 81, a card detection sensor 82, and a card reader/writer (ETC card reading means) 83. The wireless communication unit 85 serves to wirelessly communicate with an on-road device (not shown), installed at a tollgate of an interchange of an expressway, to transmit/receive information associated with toll payment via an ETC antenna (not shown). The ETC apparatus controller 80 is responsible for control over the whole ETC apparatus 5. The interface 81 is connected to the navigation apparatus 3 to enable communication with the navigation apparatus 3. The card detection sensor 82 is disposed inside the ETC card slot 84 opening at the front surface of the ETC apparatus 5 to detect insertion of the ETC card 47 into the ETC card slot 84 (that is, to detect readiness to read information stored in the ETC card 47). The card reader/writer (ETC card reading means) 83 is used to read/write information from/into the ETC card inserted in the ETC card slot 84 associated with payment of the toll.

When the card detection sensor 82 detects insertion of the ETC card 47 into the ETC card slot 84, the ETC apparatus controller 80 transmits a detection signal to the navigation apparatus 3 via the interface 81.

Now, a brief explanation is given below as to types of cards that are inserted into the card slot 42 of the navigation apparatus 3 or the ETC card slot 84 of the ETC apparatus 5 in the information providing system 1, and also a brief explanation is given as to the content of information provided by the navigation apparatus 3, based on the inserted card. FIG. 3 shows examples of information provided by the navigation apparatus 3 based on the contents (data) of the inserted card.

As shown in FIG. 3, for example, when the ETC card 47 is inserted in the ETC card slot 84 of the ETC apparatus 5, traffic information associated with a expressway such as congestion information or traffic control/restriction information (in terms of, for example, lane or road closures, speed limits, etc.), or information indicating the location and the fee of a parking lot where access can be obtained using the ETC card.

In a case in which the wireless communication card 45 is inserted in the card slot 42 of the navigation apparatus 3, information is provided as to the location of a facility where a personal computer or a portable information terminal (such as a PDA device) may be connected to access the Internet.

When the memory card 46 or the HDD card is inserted in the card slot 42 of the navigation apparatus 3, guidance information (discount information, price information, and/or days and hours of operation (open or closed)) is provided for a facility stored in the memory card 46 or the HDD card.

In a case where a credit card is inserted in the card slot 42 of the navigation apparatus 3, guidance information (discount information, prices, days and hours of operation (open or closed)) for a facility accepting the credit card is provided.

When a navigation route is set in the navigation apparatus 3, information indicating traffic conditions along the navigation route over a range of 20 km from the current position of the vehicle is provided as the traffic information. However, if no navigation route is set, information indicating traffic conditions over the entire area in the range of 20 km is provided as the traffic information.

The facility information (including information about parking lots) may be limited to information for facilities located within, for example, 10 km from the current position of the vehicle.

Figure 4:
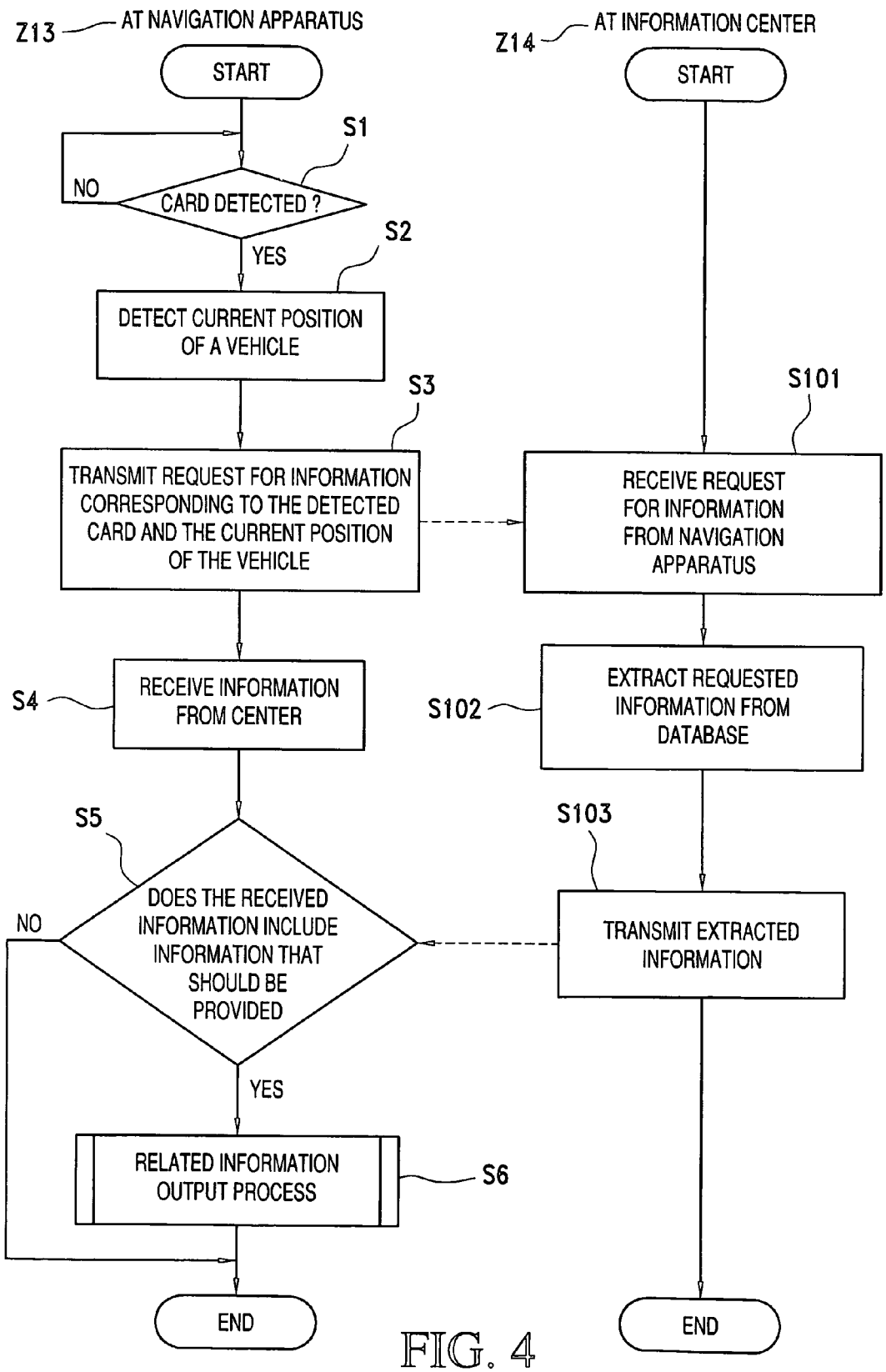
FIG. 4 is a flow chart of an information providing program executed by an information providing system according to an embodiment of the present invention.
Figure 5:
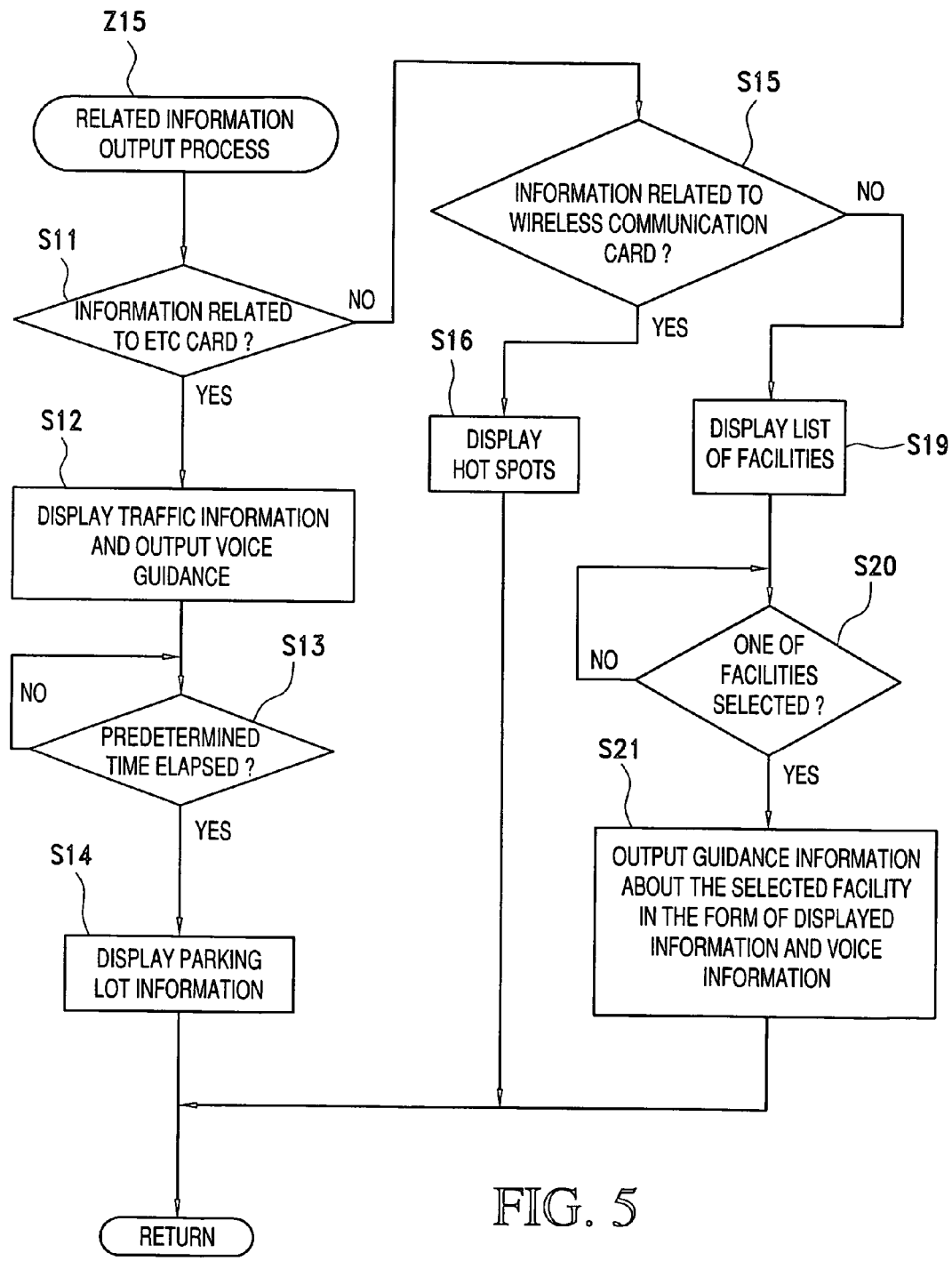
FIG. 5 is a flow chart of a subroutine for a related information output process executed in an information system according to an embodiment of the present invention.

Now, referring to FIG. 4, a navigation information providing program executed by the CPU 61 of the navigation apparatus 3 in the information providing system 1 and a center information providing program executed by the CPU 15 of the information center 2 are described below. FIG. 4 is a flow chart of an information providing program according to an embodiment of the present invention. Note that programs shown in flow charts of FIGS. 4 and 5 are stored in the RAM 62 or the ROM 63 of the navigation apparatus 3 or in the RAM 16 or the ROM 17 of the server 11 of the information center 2, and the programs are executed by the CPU 61 or the CPU 15.

In the present embodiment, the information providing program is executed by the CPU 61 of the navigation apparatus 3 or by the CPU 15 of the information center 2 when one of the wireless communication card 45, the memory card 46, the ETC card 47, the HDD card, and the credit card is inserted into the card slot 42 or the ETC card slot 84, in order to provide traffic information or facility information associated with the inserted card from the information center 2 to the navigation apparatus 3. This makes it possible to provide, not only normal navigation guidance information, but also traffic information or facility information specifically associated with the inserted card.

First, referring to FIG. 4, the information providing program is executed on the navigation apparatus 3 as follows. In step S1, the CPU 61 determines whether the wireless communication card 45, the memory card 46, the ETC card 47, the HDD card, or the credit card has been inserted into the card slot 42 or in the ETC card slot 84 of the ETC apparatus 5, and whether the navigation apparatus is ready to read the information stored by the card reader/writer 38 or 83 or information received by the inserted card. More specifically, detection of insertion of a card in the card slot 42 of the navigation apparatus 3 results in a detection signal output from the card detection sensor 37, and the detection of insertion of a card into the ETC card slot 84 of the ETC apparatus 5 results in a detection signal output from the ETC apparatus 5 via the interfaces 40 and 81. This step S1 represents the function of "card detection means" or "ETC card detection means."

After detection of insertion of a card (that is, if the answer in step S1 is Yes), the routine proceeds to step S2. On the other hand, if no card is detected (that is, if the answer in step S1 is No), a normal navigation operation such as a route guidance operation is continued until a card is detected.

In step S2, the current position detector 31 detects the current position of the vehicle. In step S3, the CPU 61 transmits a request signal to the information center 2 to request information in accordance with the type of card detected in step S1 and the current position of the vehicle detected in step S2. More specifically, the information requested of the information center 2 by the navigation apparatus 3 is exemplified by the items of information shown in FIG. 3 associated with an area in the range of 20 km from the current position of the vehicle.

In step S4, that information, which is transmitted from the information center 2 in response to the request issued in step S3 is received. In step S5, it is determined whether the information received in step S4 includes information to be provided to the user. Note that the determination as to whether to provide information is made based on a criterion predetermined for each information type. For example, in the case of traffic congestion information, if there is congestion over a distance equal to or greater than 500 m, it is determined that the traffic congestion information should be communicated to the user. However, if there is congestion along a distance less than 500 m, it is determined that it is not necessary to provide the traffic congestion information. Steps S3 and S4 correspond to the function of the "information acquisition means."

If the determination in step S5 is that there is information to provide (that is, if the answer in step S5 is Yes), then in step S6 a related information output routine is executed to provide information to the user by using the liquid crystal display 35 and the speaker 36 (see FIG. 5). On the other hand, if the determination in step S5 is that there is no information to provide (that is, if the answer in step S5 is No), the information providing routine is ended.

Now, referring to FIG. 4, an information providing program is executed at the information center 2 as described below. First, in step S101, the CPU 61 receives a request signal requesting information, transmitted in step S3 from the navigation apparatus 3.

In step S102, in accordance with the request received in step S101, the CPU 61 extracts the requested information from the traffic information database 18 and the facility information database 19 in the information database 12. FIG. 3 shows a specific example of items of information which are extracted, and traffic information associated with roads in an area within the range of 20 km from the current position of the vehicle and facility information associated with facilities located in the area within the range of 20 km from the current position of the vehicle are also extracted.

In step S103, the information extracted in step S102 is transmitted to the navigation apparatus. After step S103 is completed, the information providing routine is ended.

Referring to FIG. 5, a subroutine of the related information output routine, performed in step S6 by the CPU 61 of the navigation apparatus 3 in the present embodiment, is described below.

In the first step S11 of the related information output routine, it is determined whether the information received in step S4 is information related to the ETC card 47. Note that the "information related to the ETC card 47" refers to traffic information indicating traffic congestion, traffic control/restriction information (in terms of, for example, lane or road closures, speed limits, etc.) or information indicating the locations and fees of parking lots that can be accessed using the ETC card (see FIG. 3).

When it is determined that the received information is information related to the ETC card (that is, if the answer in step S11 is Yes), the routine proceeds to step S12. However, if it is determined that the received information is not information related to the ETC card (that is, if the answer in step S11 is No), the routine proceeds to step S15.

In step S12, of the received information, traffic information indicating traffic congestion or the traffic control/restriction information is first displayed on the liquid crystal display 35 and voice information of the same content is output via the speaker 36. In this routine, if a navigation route is set in the navigation apparatus 3, information indicating traffic conditions along the set navigation route over a distance of 20 km, for example, from the current position of the vehicle, is provided as the traffic information. However, if no navigation route is set, information indicating traffic conditions over the entire area in the range of 20 km is provided as the traffic information.

In step S13, a determination is made as to whether a predetermined time (5 sec in the present embodiment) has elapsed. If it is determined that the predetermined time has not elapsed (that is, if the answer in step S13 is No), the routine waits for the predetermined time to elapse. If it is determined that the predetermined time has elapsed (that is, if the answer in step S13 is Yes), the routine proceeds to step S14. In step S14, of the received information, that information indicating the locations and fees of parking lots that can be accessed by using the ETC card is displayed on the liquid crystal display 35. In this case, information for parking lots located in the range of 10 km from the current position of the vehicle is displayed.

Figure 6:
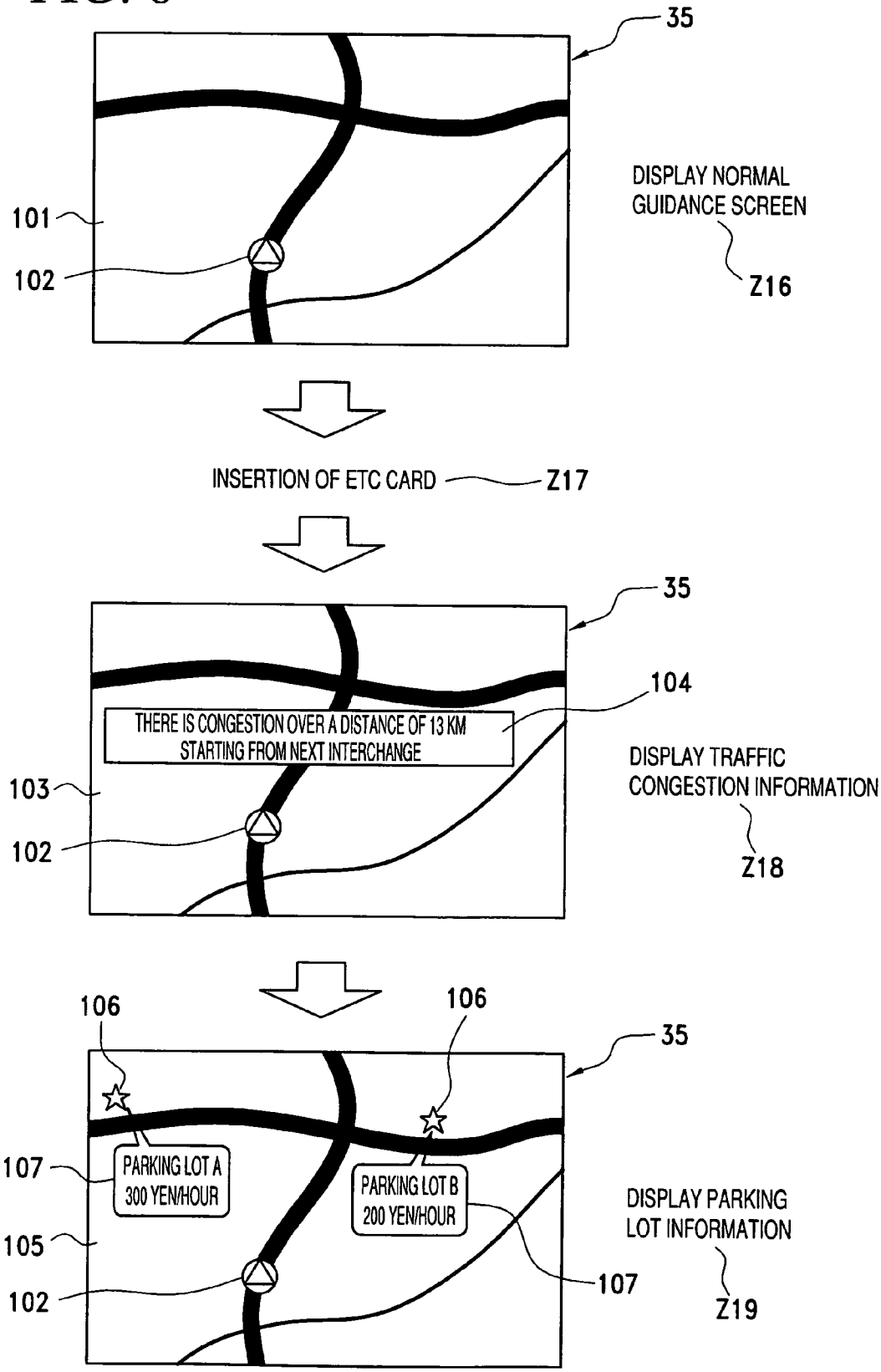
FIG. 6 shows specific examples of information displayed on a liquid crystal display of a navigation apparatus when an ETC card is inserted into an ETC card slot of an ETC apparatus.

FIG. 6 shows specific examples of information displayed on the liquid crystal display 35 of the navigation apparatus 3 when the ETC card 47 is inserted into the ETC card slot 84 of the ETC apparatus 5.

As shown in FIG. 6, before the ETC card 47 is inserted, a normal guidance screen 101 is displayed on the liquid crystal display 35 by the normal navigation functions of the navigation apparatus 3. A map of the vicinity around the current position of the vehicle, a mark 102 indicating the current position of the vehicle on the map and the running direction of the vehicle are displayed on the normal guidance screen 101.

When the ETC card is inserted, the screen displayed on the liquid crystal display 35 is switched from the normal guidance screen 101 to a traffic information screen 103. The traffic information screen 103 includes a traffic information display box 104 in which information indicating traffic congestion or traffic control/restriction information (in terms of, for example, road and/or lane closures, speed limits, etc.) is displayed, and voice information with the same content as that displayed in the traffic information display box 104 is output from the speaker 36 (step S12).

When the predetermined time has elapsed, the screen displayed on the liquid crystal display 35 is switched from the traffic information screen 103 to a parking lot information screen 105. On the parking lot information screen 105 are displayed marks 106 indicating locations of parking lots that can be accessed using the ETC card and a parking fee display box 107 in which parking fees of respective parking lots corresponding to the marks 106 are displayed (step S14).

Thus, when the user inserts the ETC card 47 into the ETC apparatus 5, information specifically related to the ETC card 47 is provided from the information center 2, in addition to normal information, and thus greater convenience is provided to the user. Note that step S12 corresponds to the function of the "associated traffic information providing means," and step S14 corresponds to the function of the "associated parking lot information providing means."

On the other hand, when it is determined in step S11 that the received information is not information related to the ETC card 47 (that is, if the answer to step S11 is No), the routine proceeds to step S15 to determine whether the information received in step S4 is information related to the wireless communication card 45. Note that the information related to the wireless communication card 45 refers to information indicating locations where an internet (e.g. high speed internet) is available (see FIG. 3).

If it is determined that the received information is information related to the wireless communication card 45 (that is, if the answer in step S15 is Yes), the routine proceeds to step S16. However, if it is determined that the received information is not information related to the wireless communication card 45 (that is, if the answer in step S15 is No), the routine proceeds to step S19.

In step S16, information indicating locations of facilities where internet connections are available is displayed on the liquid crystal display 35. Note that the information indicating the locations of facilities is limited to facilities within a range of 10 km from the current position of the vehicle.

Figure 7:
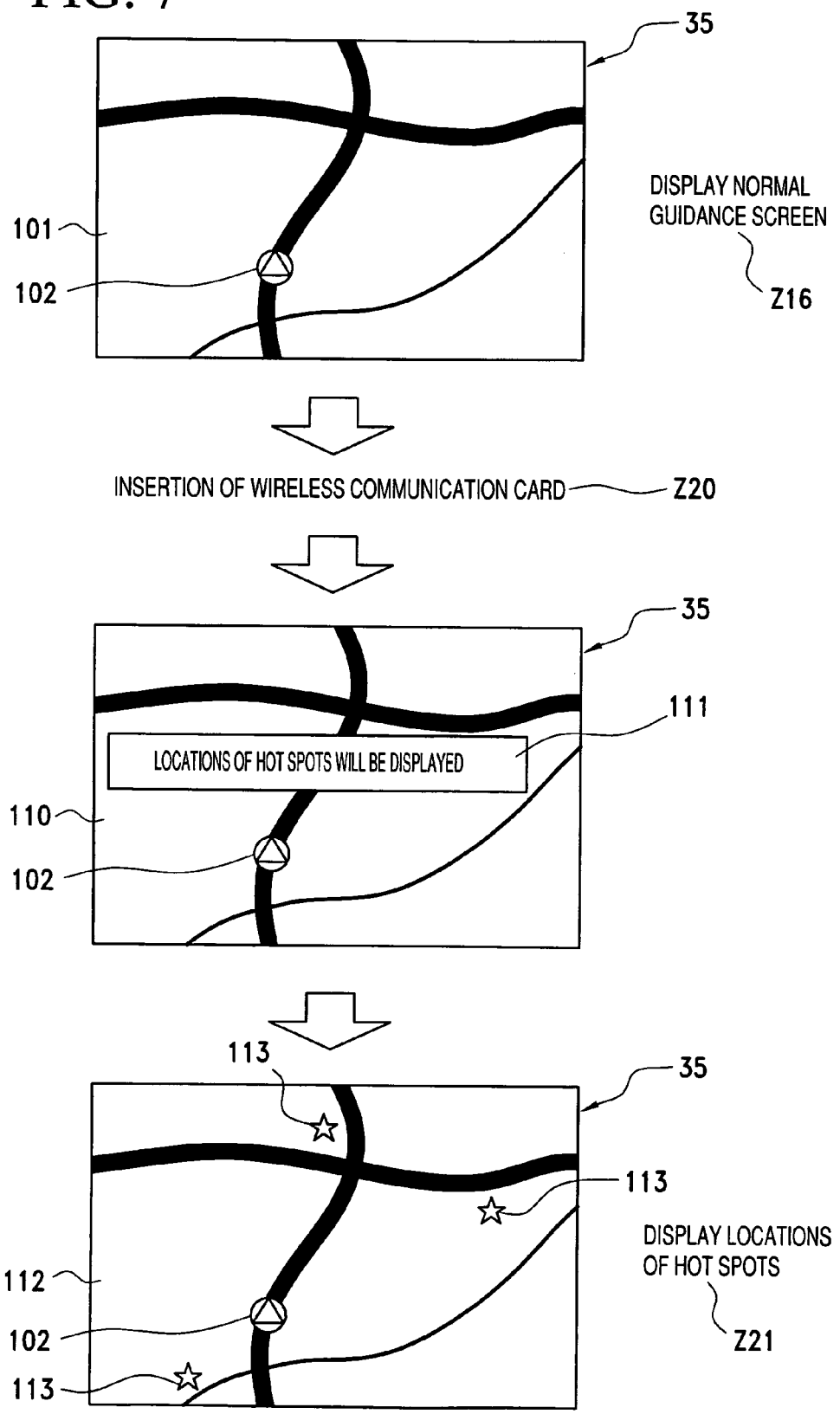
FIG. 7 shows examples of information displayed on a liquid crystal display of a navigation apparatus when a wireless communication card is inserted into a card slot of the navigation apparatus.

FIG. 7 is a diagram showing examples of information that is displayed on the liquid crystal display 35 of the navigation apparatus 3 when the wireless communication card 45 is inserted into the card slot 42 of the navigation apparatus 3.

As shown in FIG. 7, before the wireless communication card 45 is inserted, a normal guidance screen 101 is displayed on the liquid crystal display 35 in accordance with the normal navigation functions of the navigation apparatus 3. A map of the vicinity around the current position of the vehicle, a mark 102 indicating the current position of the vehicle on the map, and the running direction of the vehicle are displayed on the normal guidance screen 101.

When the wireless communication card 45 is inserted, the screen displayed on the liquid crystal display 35 is switched from the normal guidance screen 101 to a guidance switching warning screen 110. In a comment display box 111 of the guidance switching warning screen 110, information is displayed to notify the user that locations of facilities where internet connection is available, and voice information having the same content as that displayed in the comment display box 111 is output from the speaker 36.

After the guidance switching warning screen 110 is displayed for a while, the screen displayed on the liquid crystal display 35 is switched from the guidance switching warning screen 110 to an internet connection information screen 112. On the internet connection information screen 112, marks 113 indicating the locations of facilities where a high speed internet connection is available are displayed (step S16).

As described above, when the user inserts the wireless communication card 45 into the card slot 42, information specifically related to the wireless communication card 45 is selected from the information provided by the information center 2 and is provided to the user. Thus, great convenience is provided to the user. Note that step S16 described above corresponds to the function of the "associated facility information providing means."

If the determination in step S15 is that the received information is not information related to the wireless communication card 45 (that is, if the answer in step S15 is No), that is, in a case in which the information received in step S4 is information related to one of the memory card 46, the HDD card, and the credit card, the routine proceeds to step S19. Note that in this example, the information related to the memory card 46 or the HDD card is guidance information associated with facilities stored in a storage medium such as the memory card 46 or the HDD card, and an example of the information related to the credit card is guidance information for facilities that accept the credit card, i.e. facilities (under contract) with the user's credit card company (see FIG. 3).

In step S19, a list of facility names acquired from the information center 2 is displayed on the liquid crystal display 35. Note that facilities displayed are limited to those within a range of 10 km from the current position of the vehicle.

In step S20, based on an operation signal from the operation unit 34, it is determined whether one of the facilities has been selected from the displayed list. If the determination in step S20 is that no facility has been selected (that is, if the answer in step S20 is No), the routine waits for one of facilities to be selected. On the other hand, if the determination in step S20 is that one of facilities has been selected (that is, if the answer in step S20 is Yes), then the routine proceeds to step S21.

In step S21, guidance information for the facility selected from the list of facilities is displayed on the liquid crystal display 35.

Figure 8:
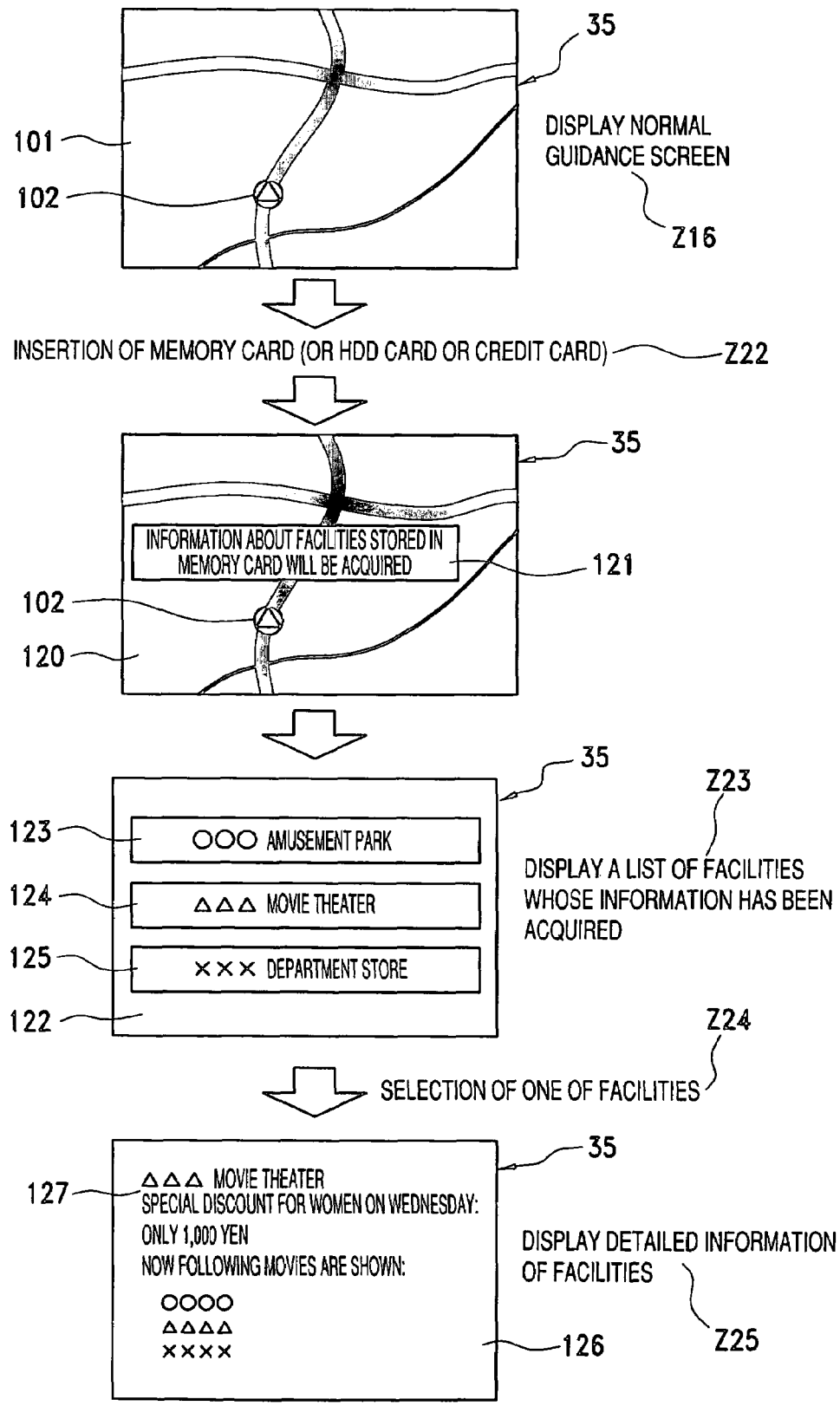
FIG. 8 shows examples of information displayed on a liquid crystal display of a navigation apparatus when a memory card, a HDD card, or a credit card is inserted into a card slot 42 of the navigation apparatus.

FIG. 8 shows examples of items of information that are displayed on the liquid crystal display 35 of the navigation apparatus 3 when the memory card 46, the HDD card, or the credit card is inserted into the card slot 42 of the navigation apparatus 3.

As shown in FIG. 8, before the memory card 46, the HDD card or the credit card is inserted, a normal guidance screen 101 is displayed on the liquid crystal display 35 by normal navigation functions of the navigation apparatus 3. A map of the vicinity around the current position of the vehicle, a mark indicating the current position of the vehicle on the map, and the running direction of the vehicle are displayed on the normal guidance screen 101.

If the memory card 46, the HDD card or the credit card is inserted, the screen displayed on the liquid crystal display 35 is switched from the normal guidance screen 101 to a guidance switching warning screen 120. In a comment display box 121 on the guidance switching warning screen 120, a list of facilities stored in the memory card 46 or the HDD card or a list of facilities that accept the credit card are displayed, and voice information having the same content as that displayed in the comment display box 121 is output from the speaker 36.

After the guidance switching warning screen 120 is displayed for a while, the screen displayed on the liquid crystal display 35 is switched from the guidance switching warning screen 120 to a facility list screen 122. On the facility list screen 122, facility names acquired from the information center 2 are displayed in the form of a list. In the example shown in FIG. 8, three facilities are displayed. That is, "ooo amusement park" is displayed in a first display box 123, "ΔΔΔ movie theater" is displayed in a second display box 124, and "xx department store" is displayed in a third display box 125.

Thereafter, if one of the facilities is selected from the displayed list, the screen displayed on the liquid crystal display 35 is switched to a detailed information screen 126 to display detailed information on the selected facility. Detailed information about the selected facility is displayed in the form of a sentence 127 on the detailed information screen 126. In the specific example shown in FIG. 8, "ΔΔΔ movie theater" (displayed in the second display box 124) is selected, and detailed information about the ΔΔΔ movie theater is displayed.

As described above, when the user inserts the memory card 46, the HDD card or the credit card into the card slot 42, information intimately (specifically) related to the inserted card is selected from information provided by the information center 2 and is provided, in addition to the normal information routine guidance, to the user. Note that steps S19 and S21 described above correspond to the function of the "associated facility information providing means."

As described above, if one of the wireless communication card 45, the memory card 46, the ETC card 47, the HDD card, and the credit card is inserted into the card slot 42 or the ETC card slot 84 (that is, if the answer in step S1 is Yes), traffic information or facility information related specifically to the inserted card is transmitted from the information center 2 to the navigation apparatus 3 (steps S3 and S4), and the traffic information or the facility information related to the inserted card is provided to the user, in addition to the normal route guidance information (step S6). Thus, it is possible to select information specifically related to the inserted card from the information provided by the information center 2 and to provide the selected information to the user via the navigation apparatus. Thus, the user can obtain that information necessary in view of the current conditions.

In particular, when the ETC card 47 is inserted, traffic information associated with an expressway and having a high probability of being used by the user and information associated with a parking lot and having a high probability of being used by the user are provided, at great convenience to the user.

Note that although the present invention has been described above with reference to specific embodiments, the present invention is not limited to those specific embodiments described above, but various improvements or modifications are possible without departing from the scope of the present invention.

For example, although in the embodiments described above, the wireless communication card 45, the memory card 46, the ETC card 47, the HDD card, or the credit card is used, other cards such as a point card or a facility membership card may be used.

Although in the embodiments described above, when an inserted card is detected, communication with the information center 2 is initiated to acquire traffic information and facility information, related to the detected card, from the traffic information database 18 and the facility information database 19 of the information center 2 via the network 4, instead, databases corresponding to the traffic information database 18 and the facility information database 19 may be disposed in the data storage unit 32 of the navigation apparatus 3 so that traffic information or facility information related to an inserted card is provided, not via the information center 2, but directly to the user.

What is claimed is:

1. An information providing system for a vehicle, including an information providing apparatus and a navigation apparatus, and card reading means for reading information stored in a card or information transmitted to the card, wherein:
   the information providing apparatus comprises:
   information storage means for storing information; and
   information transmission means for transmitting the information stored in the information storage means to the navigation apparatus; and
   the navigation apparatus comprises:
   information reception means for receiving information transmitted from the information providing apparatus;
   information providing means for providing the information received by the information reception means to a user;
   card detection means for detecting card type of the card and readiness for the information stored in or transmitted to the card to be read by the card reading means;
   information acquisition means for, when the card detection means detects readiness to read the information, acquiring information about a facility associated with the detected card type from the information providing apparatus; and
   associated facility information providing means for providing, via the information providing means, the information about the facility acquired by the information acquisition means.

2. An information providing system for a vehicle including an information providing apparatus, a navigation apparatus, and ETC card reading means for reading information stored in an ETC card, wherein:
   the information providing apparatus comprises:
   information storage means for storing information; and
   information transmission means for transmitting the information stored in the information storage means to the navigation apparatus; and
   the navigation apparatus comprises:
   information reception means for receiving information transmitted from the information providing apparatus;
   information providing means for providing the information received by the information reception means to a user;
   ETC card detection means for detecting readiness for the information stored in or transmitted to the card to be read by the ETC card reading means;
   information acquisition means for, when the ETC card detection means detects readiness to read the information by the ETC card reading means, acquiring traffic information for an expressway associated with the ETC card from the information providing apparatus; and
   associated traffic information providing means for providing, via the information providing means, the traffic information for the expressway acquired by the information acquisition means.

3. An information providing system for a vehicle including an information providing apparatus, a navigation apparatus, and ETC card reading means for reading information stored in an ETC card, wherein:
   the information providing apparatus comprises:
   information storage means for storing information; and
   information transmission means for transmitting the information stored in the information storage means to the navigation apparatus; and
   the navigation apparatus comprises:
   information reception means for receiving information transmitted from the information providing apparatus;
   information providing means for providing the information received by the information reception means to a user;
   ETC card detection means for detecting readiness to read the information by the ETC card reading means;
   information acquisition means for, when the ETC card detection means detects readiness to read the information by the ETC card reading means, acquiring information associated with a parking area for which the ETC card provides access, from the information providing apparatus; and
   associated parking lot information providing means for providing, via the information providing means, the information associated with the parking area acquired by the information acquisition means.

4. A navigation apparatus comprising:
   card detection means for detecting card type of a card and readiness to read, by card reading means, information stored in the card or information transmitted to the card;
   information acquisition means for, when the card detection means detects readiness to read the information by the card reading means, acquiring information about a facility associated with the detected card type; and
   associated facility information providing means for providing the information about the facility acquired by the information acquisition means.

5. The navigation apparatus according to claim 4, further comprising:
   information reception means for receiving information transmitted from an information providing apparatus; and
   wherein the information acquisition means acquires the information from the information providing apparatus via the information reception means.

6. A navigation apparatus comprising:

ETC card detection means for detecting readiness to read information stored in an ETC card by ETC card reading means;

information acquisition means for, when the ETC card detection means detects readiness to read the information by the ETC card reading means, acquiring traffic information for an expressway associated with the ETC card; and associated traffic information providing means for providing the traffic information for the expressway acquired by the information acquisition means.

7. The navigation apparatus according to claim 6, further comprising:

information reception means for receiving information transmitted from an the information providing apparatus; and wherein the information acquisition means acquires the information from the information providing apparatus via the information reception means.

8. A navigation apparatus comprising:

ETC card detection means for detecting readiness to read information stored in an ETC card by ETC card reading means;

information acquisition means for, when the ETC card detection means detects readiness to read the information by the ETC card reading means, acquiring information associated with a parking area where access is obtainable by use of the ETC card; and associated parking lot information providing means for providing the information associated with the parking area acquired by the information acquisition means.

9. The navigation apparatus according to claim 8, further comprising:

information reception means for receiving information transmitted from an information providing apparatus; and wherein the information acquisition means acquires the information from the information providing apparatus via the information reception means.

* * * * *